United States Patent Office 3,740,283
Patented June 19, 1973

3,740,283
METHOD OF MAKING A COMPOSITE PRODUCT OF STRENGTHENED, WATER-BLOWN, FLEXIBLE POLYURETHANE FOAM
Edwin Morgan Maxey, Stow, Ohio, assignor to The General Tire & Rubber Company
No Drawing. Filed July 31, 1970, Ser. No. 60,144
Int. Cl. B31c 13/00; B32f 27/40; B29d 27/00
U.S. Cl. 156—162       8 Claims

ABSTRACT OF THE DISCLOSURE

In the field of flexible foams, the ability of the foam to support a given load (termed "Sac factor" in the foam art) is generally directly proportional to the foam's density. In certain applications such as in rug underlay the Sac factor requirement is set very high and is achieved by densifying an inexpensive rubber foam with fillers. This invention is a method of raising the Sac factor and load carrying capacity of water-blown flexible polyurethane foam by compression and heat treatment thereby allowing it to become competitive with conventional loaded rubber foam.

BACKGROUND OF THE INVENTION

Field of the invention

This invention relates to the field of polyurethane foam. More particularly, this invention relates to the field of water-blown polyurethane foam and to processes utilized in conjunction therewith.

DESCRIPTION OF THE PRIOR ART

Polyurethane chemistry and the manufacture of polyurethane foam are generally well-known and highly developed. In this art, one of the most useful types of polyurethane foam is "water-blown" foam. This particular foam utilizes water in the generation of the primary blowing gas ($CO_2$), and to form urea and biuret linkages that give the foam its load supportability, and may be used in combination with secondary blowing agents to produce foams having a wide variety of densities and Sac factors.

Generally speaking, a water-blown polyurethane foam is prepared from the reactions involving polyol, polyisocyanate, and water. These three components enter into four general chemical reactions which continue until they and their reactive products are fully spent. As shown below in Equation 1, an hydroxy terminated polyether or polyester polyol (shown here as a polyether diol) reacts with a polyisocyanate [shown here as 2,4-toluene diisocyanate (TDI)] to form a polyurethane (extended polymer). This polyurethane contains a residual active isocyanato group which may react with either more of the polyol, water, or products of other reactions.

(1) 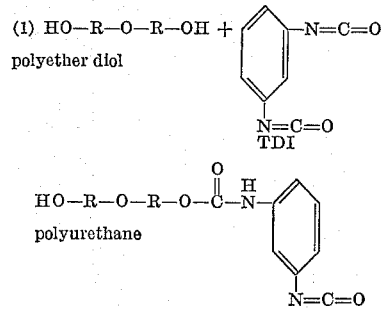

As shown in Equation 2, the polyurethane reacts with water forming a primary amine and liberating carbon dioxide; this carbon dioxide is evolved as a multitude of small bubbles that expand the viscous materials into a cellular structure—otherwise known as the "blowing reaction."

(2) 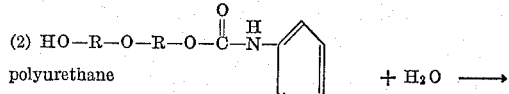

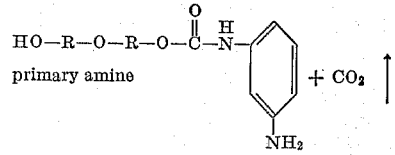

As shown in Equation 3, the primary amine reacts with further isocyanate to form a di-substituted urea that contains a residual active isocyanato group. This residual group may react with polyol, water, or more primary amine.

(3) 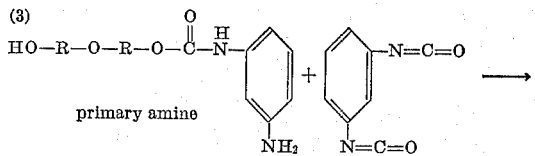

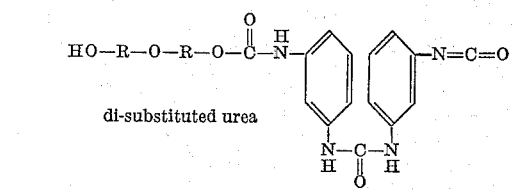

As shown in Equation 4, this di-substituted urea reacts with the polyurethane to form a cross-linked biuret structure. This biuret structure contains residual hydroxyl groups on the polyol as well as residual isocyanato groups that may further react with the various components to eventually form a highly cross-linked polyurethane foam structure.

(4) 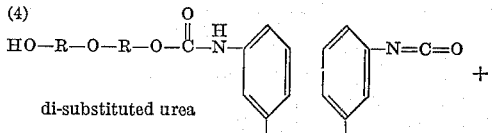

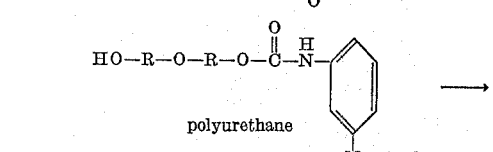

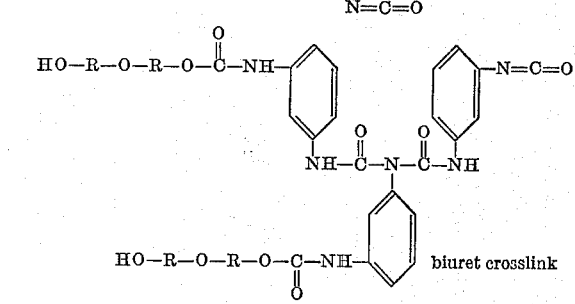

Sac factor or load supportability is influenced by a number of factors. Foam density has a rather direct influence, i.e., an increase in foam density results in a higher load supportability due to the increase in mass of material resisting the load. Urea and biuret linkages also have a direct influence on the Sac factor, however, these linkages are caused by the presence of water in the formualtion; increasing the urea and biuret linkages requires more water which causes more $CO_2$ to be generated and reduces the foam's density. Therefore, these two influences, density and urea/biuret linkages, while directly enhancing the Sac factor, operate in opposition to each other. Another factor influencing load supportability is the amount of hydroxyl groups on the polyol molecule; increasing the amount of hydroxyl groups increases the degree of crosslinking in the foam. While this will increase load supportability to a limited degree, the foam rapidly loses resilience and becomes more rigid.

In certain applications, such as rug underlay, the Sac factor requirement is set very high and is generally achieved by densifying inexpensive rubber foam with fillers. Such heavy loading severely impairs other properties of the foam such as tensile strength and compression set, however, with the large amount of underlay required for rug laying, this practice has proved to be by far the most economical notwithstanding considerable difficulties occasioned by these poorer foam properties.

Flexible polyurethane foam may be formulated to serve admirably as rug underlay material. In adition to its natural properties of chemical inertness and extremely good aging, it may be densified to provide the desired Sac factor by lowering the amount of blowing agent or blowing agent generating material or by loading the foam with dense fillers such as barytes. By lowering the amount of blowing agent or blowing agent generating material the foam becomes extremely expensive on a volume basis as compared with heavily loaded rubber foams. By loading the polyurethane foam with dense fillers, the foam properties are reduced by and large to the level of those of the loaded rubber foam while the material cost is not so greatly reduced; the better aging and increased mildew resistance of the polyurethane foam is still not sufficient to offset this price differential.

This invention is based upon the discovery that the load support function of the urea-biuret structure can be utilized to raise the Sac factor and load carrying capacity of low density water-blown flexible polyurethane foams so that these relatively expensive foams may activiely compete with highly loaded rubber foams in rug underlay. The thermoplastic nature of a substantially fully cured water-blown flexible polyurethane foam is taken advantage of; in essence, the foam is compressed and heated to reset the foam structure and to concentrate" the biuret and urea structures. The resultant foam displays a synergistically high Sac factor, i.e., higher at the compressed density than a foam originally made to that density and, in addition, is less expensive "per Sac factor increment" than a non-loaded polyurethane foam. Thus, the foam becomes competitive on the basis of Sac factor cost and the all-around improvement in other foam properties heretofore unachievable with loaded foams.

Therefore, the main object of this invention is a method of strengthening water-blown flexible polyurethane foam to allow its use in applications heretofore barred by cost considerations. Other objects of this invention include a method of synergistically increasing the Sac factor and load carrying capacity of water-blown flexible polyurethane foams over that property exhibited by an as-cast foam of the same density; a method of obtaining a high load bearing polyurethane foam in a relatively inexpensive manner for use in areas where cost considerations require an inexpensive cellular material; a method of improving other properties of a rug underlay foam which maintaining competitive material costs; a method that is easy to practice, that utilizes conventional equipment, that may be practiced with a wide range of water-blown flexible polyurethane foams, and that is amenable to automatic and semi-automatic process control; and to the novel, high load bearing water-blown flexible polyurethane foams produced thereby.

SUMMARY OF THE INVENTION

This invention concerns a method of increasing the Sac factor of flexible polyurethane foam comprising the steps of compressing a substantially fully cured water-blown polyurethane foam, uniformly heating the compressed foam to a temperature of between about 250° F. and about 300° F., and maintaining this uniform temperature until the foam's resistance to compression is substantially dissipated, and then cooling and removing the foam from the compression device.

DESCRIPTION OF THE PREFERRED EMBODIMENT

This invention concerns water-blown flexible polyurethane foams. These foams are made from polyols, isocyanates, water, catalysts, surface active agents, and other optional ingredients including fillers, colorants, fungicides, flame retardants, and the like.

The polyurethane foams usable in this invention are those of the "flexible" and "semi-rigid" varieties as opposed to "rigid" polyurethane foam. Polyurethane foams may be made in different flexibilities from extremely soft to very hard; the "flexibility" of these foams is not specifically definable because the formulation may be changed incrementally to provide an incremental increase or decrease in flexibility. This situation is known in the art and persons skilled therein realize that there is a rather gray area between the exact definition of a "semi-rigid" and a "rigid" foam. Therefore, as used herein, the term "flexible" polyurethane foam will denote the types of polyurethane foams that are considered "flexible" and "semi-rigid'" (but not "rigid") by those skilled in the art and as described in the literature, see for example Polyurethanes, B. A. Dombrow, Reinhold Publishing Corporation, New York, (1965).

The polyols usable herein may be any of those useful in the production of polyurethane foam. Polyether polyols such as diols are generally prepared by reacting an alkylene oxide such as polypropylene oxide with a strong base such as potassium or sodium hydroxide. Polyether triols and tetrols are prepared by reacting higher functional materials with alkylene oxides in the presence of suitable catalysts. For example, a popular polyether triol for use herein is a 3000 MW adduct of glycerine and propylene oxide.

Polyethers having a highly branched chain network are also useful. Such highly branched chain polyethers are readily prepared from alkylene oxides and initiators having a functionality greater than two.

The higher functional initiators that are useful with the alkylene oxides, described above, include polyols, polyamines and amino alcohols having a total of three or more reactive hydrogen atoms on hydroxyl and primary or secondary amino groups. Suitable polyols include triols, such as glycerol, trimethylolpropane, butanetriols, hexanetriols, trimethylolphenol, tris (hydroxyphenyl) propane, tris (hydroxyxylyl) propane, novolaks, trialkanolamines, various tetrols, such as erythritol and pentaerythritol; pentols; hexols, such as dipentaerythritol and sorbitol, as well as alkyl glucosides , carbohydrates, polyhydroxy fatty acid esters such as castor oil, and polyoxy alkylated derivatives or poly-functional compounds having three or more reactive hydrogen atoms, such as, for example, the reaction product of trimethylolpropane, glycerol and other polyols with ethylene oxide, propylene oxide or other epoxides or copolymers thereof, e.g., copolymers of ethylene and propylene oxides. Higher functional amino alcohols and polyamines include, by way of example, ethanolamine, diethanolamine, triethanolamine, isopropanolamine, diisopropanolamine, triisopropanolamine, 2-(2-amino-ethylamino) ethanol, 2-amino-2-(hydroxymethyl)-1,3-propanediol, diethylenetriamine, triethylenetetramine, urea and urea-formaldehyde polymers as well as various aryl polyamines, such as 4,4',4''-methylidynitrianiline.

Another means of increasing the degree of branching, if desired, when employing linear polyethers, is to include a highly functional initiator, as described above, in the mixture charged to the reaction.

Preferred polyethers of the branched type are those prepared by adding propylene oxide to various diols, triols, tetrols and polyols as starters to produce adducts of various molecular weights. Polyethers which deserve special mention are the 1,2,6-hexanetriol and glycerol adducts of propylene oxide having molecular weights of 250, 500, 700, 1500, 2500, 3000, and 4000.

The amount of highly functional initiator normally employed with the linear type polyethers described above is an amount in the range of from 0.5 to 6.0 percent by weight of said initiator based on the weight of polyether charged to the reaction.

Generally, the polyethers suitable for employment can be conveniently characterized as normally liquid (although meltable solid polyethers are not excluded), pourable polyethers having viscosities in the range of from 50 centipoises to about 500,000 centipoises at room temperature (i.e., 25° C.) and having preferably molecular weights in the range of from 200 to about 10,000.

Polyester polyols are generally prepared from the condensation of a staturated or unsaturated mono- or polycarboxylic acid and a polyhydric alcohol. Examples of suitable polyhydric alcohols include the following: glycerol; pentaerythritol; mannitol; trimethylolpropane; sorbitol; methyltrimethylolmethane; 1,4,6 - octanetriol; ethylene glycol, diethylene glycol, propylene glycol; butanediol; pentanediol; hexanediol; dodecanediol; octanediol; chloropentanediol, glycerol monoallyl ether; glycerol monoethyl ether, triethylene glycol; 2-ethylhexanediol-1,4; 3,3' - thiodipropanol; 4,4' - sufonyldihexanol; cyclohexanediol-1,4; 1,2,6-hexanetriol, 1,3,5-hexanetriol; polyallyl alcohol; 1,3-bis (2-hydroxyethoxy) propane; 5,5'-dihydroxydiamyl ether; 2,5-dipropanol, tetrahydrofuran-2,5-dipentanol, 2,5-dihydroxytetrahydrofuran; tetrahydropyrrole-2,5 propanol; 3,4-dihydroxytetrahydropyran; 2,5-dihydroxy-3,4-dihydro-1,2 pyran; 4,4'-sulfinyldipropanol; 2,2-bis (4-hydroxyphenyl)-propane; 2,2'-bis (4-hydroxyphenyl)methane, and the like.

Examples of polycarboxylic acids include the following: phthalic acid, isophthalic acid; tetrachlorophthalic acid; maleic acid; dodecylmaleic acid; octadecenylmaleic acid; fumaric acid; aconitic acid, itaconic acid, trimellitic acid; tricarballylic acid; 3,3'-thiodipropionic acid; 4,4'-sulfonyl-dihexanoic acid; 3-octenedioic-1,7 acid; 3-methyl-3-decenedioic acid; succinic acid; adipic acid; 1,4-cyclohexadiene-1,2-dicarboxylic acid; 3-methyl-3,5-cyclohexadiene-1,2-dicarboxylic acid; 8,12-eicosadienedioic acid; 8-vinyl-10-octadecenedioic acid; and the corresponding acid anhydrides, acid chlorides, and acid esters such as phthalic anhydride, phthaloyl chloride, and the dimethyl ester of phthalic acid. Other polyols may be used herein such as specialty types that are not considered as being purely a polyether or a purely polyester polyol.

The polyisocyanates that may be used in this invention include di- and trifunctional isocyanates. Examples of some of these include toluene-2,4-diisocyanate,
toluene-2,6-diisocyanate,
1,5-napthalene-diisocyanate,
cumene-2,4-diisocyanate,
4-methoxy-1,3-phenylenediisocyanate,
4-chloro-1,3-phenylenediisocyanate,
4-bromo-1,3-phenylene-diisocyanate,
4-ethoxy-1,3-phenylenediisocyanate,
2,4-diisocyanatodiphenylether,
5,6-dimethyl-1,3-phenylenediisocyanate,
2,4-dimethyl-1,3-phenylenediisocyanate,
4,4'-diisocyanatodiphenylether,
4,6-dimethyl-1,3-phenylenediisocyanate,
9,10-anthracenediisocyanate,
4,4'-diisocyanatodibenzyl,
3,3'-dimethyl-4,4'-diisocyanatodiphenylmethane,
2,6-dimethyl-4,4'-diisocyanatodiphenyl,
4,4'-diisocyanatodiphenylmethane,
2,4-diisocyanatostilbene,
3,3'-dimethyl 4,4'-diisocyanatodiphenyl,
3,3'-dimethoxy-4,4'-diisocyanatodiphenyl,
1,4-anthracenediisocyanate,
2,5-fluroenediisocyanate,
1,8-naphthalenediisocyanate,
2,6-diisocyanatobenzofuran, and
2,4,6-toluenetriisocyanate.

It is to be understood that mixtures of two or more of these polyisocyanates may be employed.

Catalysts are added to accelerate the different reactions. The chain-extension reaction, where the polyol reacts with the isocyanate to produce the polyurethane, is accelerated by tertiary amines, especially when they contain a tin cocatalyst. The tertiary amines also catalyze the carbon dioxide - forming reaction; alkyl morpholines contribute certain physical properties to the foam such as tear resistance and tensile strength. Suitable tertiary amines include triethylene diamine, tetramethyl butane diamine, triethylamine, N-methyl morpholine, N-ethyl morpholine, diethyl ethanolamine, N-coco morpholine, 1-methyl-4-dimethylamino ethyl piperazine, ε-methoxy-N-dimethyl propyl amine, N-dimethyl-N'-methyl isopropyl propylene amine, N,N-diethyl-3-diethyl amino propyl amine, and dimethyl benzyl amine. Examples of tin cocatalysts include dibutyl tin dilaurate, stannous chloride, dibutyl tin di-2-ethyl hexoate, stannous octoate, and stannous oleate. The surface active agent, when used, stabilizes the cell structure during foam rise and prevents slumping, collapsing, and ripping of the cells.

The density of the starting foam or the foam made prior to the compression step may vary from as low as 0.7 pound per cubic foot to as high as desired, i.e., five pounds per cubic foot or more. However, it should be noted that the major benefits of this invention are obtained by starting with an uncompressed water-blown foam of as low a density as possible so as to save on starting materials such as the polyisocyanate. Generally speaking, foams having a density from 1.0 to 1.5 pounds per cubic foot find the greatest advantage in this process.

The water-blown foams usable in this invention are the water-blown foams presently conventional in the art. These may include open-cell flexible polyurethane foam, "wrung out" opened cell polyurethane foam such as that described in United States Pat. 3,060,137, and the like.

Generally, the method of this invention comprises the steps of compressing a substantially fully cured water-blown flexible polyurethane foam to the desired density, uniformly heating the compressed foam to a temperature of between about 250° F. and about 300° F., maintaining this temperature until the foam's resistance to compression is substantially dissipated, and then cooling and removing the foam from the compression device. The foam should be substantially fully cured prior to incorporating the method of this invention. By "substantially fully cured" is meant that the foam has preceded through a conventional heat-curing cycle to the point where it is considered fully cured and exhibits the physical properties of a fully cured urethane foam such as lack of stickiness on the surface, proper resiliency, lack of residual indentation upon compression, etc. The foam need not be totally cured (this state is difficult to determine); as used herein, a foam that has been heat cured to the point where its physical properties cease to change markedly with further heating is considered "substantially fully cured."

The foam may be compressed as much as desired; for instance, a 1 inch thick layer of substantially fully cured flexible polyurethane foam may be compressed to 1/10 of an inch in thickness and thereafter heated in accordance with the teachings of this invention to achieve the objects thereof. The degree of compression is not limited; however, it is generally controlled by the degree of synergistic increase in load-bearing ability desired in the final foam product.

After the compression step, the foam is heated in conventional heating equipment to a uniform temperature throughout wherein the temperature ranges between about 250° F. and about 300° F. Temperatures below 250° F. are insufficient to cause a change in the foam structure whereas at temperatures above about 300° F. the foam begins to rapidly degrade. Therefore, within this range of 250° F. to 300° F. the compressed foam will gradually change in internal construction and assume the thickness and size of the volume wherein it is compressed.

After the temperature in the range has been achieved uniformly throughout the foam, it is maintained until the foam has relaxed to the point wherein its resistance to compression is substantially dissipated. This point may be easily determined by observing the foam upon release from compression. If the foam substantially retains its compressed size, the proper amount of heat has been applied; whereas, if the foam tends to return to its original thickness, it has been insufficiently heated. As a specific example, a 1.5 pound per cubic foot water-blown flexible polyurethane foam of 1 inch thickness was reduced by compression to a thickness of 3/8 of an inch and heated uniformly for a period of six hours at 250° F. whereupon upon release from compression, the foam retained its compressed thickness; this illustrates the requirement to maintain the temperature until the foam's resistance to compression is substantially dissipated.

The foam is then cooled and removed from the compression device. These steps may be reversed i.e., the foam may be removed from the compression device first and thereafter allowed to cool. Cooling is most conveniently accomplished by air cooling such as in a warehouse or storage room. Another method is to merely package the foam for shipment and allow it to cool en route to the customer.

The flexible densified polyurethane foam, after processing according to the teachings of this invention, will be characterized by having a Sac factor and load carrying capacity that is synergistically above the Sac factor and load carrying capacity of a foam cast in the final density of the compressed foam. The Sac factor and load carrying capacity is determined by an ASTM Test 1564–65T and is the ratio of the 65 percent indention or compression load deflection to the 25 percent indention or compression load deflection. These Sac factor and load values indicate the degree of load bearing ability of the foam and is a popular method by which foams in the rug underlay industry and elsewhere are rated.

Other properties of the compressed foam which are markedly increased are the tensile strength and elongation of the foam. The increase in these properties makes it possible to add substantial amounts of fillers such as calcium carbonate or barytes in the manufacture of the foam which is to be compressed and still produce a foam that is strong and able to withstand the effects of constant flexing, as in rug underlay uses. Also, it is possible to add sufficient amounts of flame retardant materials while retaining good strength, Sac factor and load carrying properties in the foam.

A convenient way to compress the foam uniformly prior to heating is to wrap the foam in a layer about a mandrel. In this respect, the compression given to foam becomes uniform throughout the length and width of the foam thereby giving increased uniformity to the densification of the final product. As a further embodiment of wrapping the foam in a layer about the mandrel and specifically in regard to rug underlay, a cloth liner may be adhered to one side of the layer of foam and thereafter the two layers wrapped co-jointly about the mandrel.

The resultant densified foam will thus comprise a laminate of densified foam and a liner for immediate use as a rug underlay. A modification of this particular embodiment includes combining the foam layer and liner with a third layer comprising a chain-link or other configuration so that the compressed foam will take on a highly embossed appearance such as that presently used in the rug underlay field. Many different types of cloth liners may be used in this embodiment such as woven or non-woven cloths of natural or synthetic fibers. Examples include woven silk, wool, cotton, rayon, polyethylene terephthalate-based polyester and other commercial polyester fibers and the like as well as non-woven cloths of polyester fibers, etc.

A still further embodiment of this method is to utilize a nonadherent liner that is reversibly shrinkable so that when laid against the layer of foam and the two layers wrapped co-jointly about a mandrel and heated, the liner shrinks and provides an additional compressive force uniformly over the entire length and width of the foam. Upon cooling and unwrapping the two layers, the reversibly shrinkable liner will return to its original dimension whereas the densified foam will remain uniformly densified and reduced in thickness throughout. Specifically, a woven nylon cloth is reversibly shrinkable within the temperature range of 250° F. to 300° F. and operates to provide a desirable form of uniform compression to the foam when wrapped co-jointly therewith. Other embodiments of this invention are possible; such as, where the liner contains an embossed design that will transfer to the densified foam to form a decorative surface thereon.

In determining the amount of time required to achieve a uniform temperature throughout the foam, one must take into account the size of the foam and its cross-link density. For instance, if a long, e.g., 200 foot layer of 2 inch thick foam were wrapped about a 2 inch diameter mandrel and inserted into a forced air oven, the time necessary to achieve a uniform temperature of between 250° F. and 300° F. throughout the compressed foam would be substantially longer than that required had the foam been only 20 feet in length, one inch in thickness, and wrapped about the same mandrel. Therefore, a significant aspect in heating the foam is the time taken to achieve a uniform temperature throughout all of the foam.

Another aspect in heating the foam is the cross-link density of the foam, i.e., although water-blown flexible polyurethane foams have a certain thermoplasticity, they tend to become more thermosetting with a higher cross-link density (caused by the biuret structure). Therefore, one must observe the type of polyol and the amount of water and polyisocyanate used to make the polyurethane foam to determine, to some extent, the degree of cross-linking; a triol, having three hydroxyl groups per polymer chain, would necessarily achieve a higher cross-link density than would a diol (at the same water and polyisocyanate level). Such a determination is fully within the ambit of one skilled in the polyurethane foam art.

Following are some examples to indicate to one skilled in the art how to practice the invention as well as to point out some of the synergistic increases in Sac factor that are occasioned in the practice thereof. Unless otherwise noted, all parts are in parts by weight per 100 parts of polyol and all percentages are percentages by weight.

EXAMPLE 1

A sample (A) of a conventional, water-blown, flexible polyurethane foam was made according to the formula shown below in Table 1a. The foam was cast in a production-size continuous mold of about 8 feet wide by 4 feet high. In this particular type of molding the exotherm developed in the "bun" or foam loaf is of sufficient magnitude (about 250° F.) to cure the foam without applications of additional heat. A 2-inch thick layer of this cured foam was cut from the cured "bun" and found to have a density of 1.35 pounds per cubic foot. The layer was then wrapped co-jointly with a sheet of reversibly shrinkable woven nylon fabric under light tension about a mandrel. The material was then placed in a 270° F. circulating air oven for three hours. Upon removal and unwrapping the foam was found to have a density of 4.15 pounds per cubic foot. Another conventional water-blown flexible polyurethane foam (B), similar to that in Table 1a, was made except the water and toluene diisocyanate were reduced to provide a foam density of 4.05 pounds per cubic foot (water 1.00 part, toluene diisocyanate 80/20 20.00 parts) and a 2 inch thick layer cut therefrom. A third conventional water-blown, flexible polyurethane foam, (C), was made according to the formula shown in Table 1b; this foam was loaded with #1 barytes to a density of 4.55 pounds per cubic foot. A 2 inch thick layer was cut from the "bun." Each sample was tested for 25 percent, 65 percent, and 70 percent compression load (CLD) factor (ASTM T1564–65T) and for tensile strength and percent elongation. The results are shown below in Table 1c.

TABLE 1a

| Ingredients: | Parts |
|---|---|
| 3000 MW polyoxypropylene triol | 100.00 |
| Stannous octoate | 0.26 |
| Silicone surfactant [1] | 1.40 |
| Water | 4.20 |
| Fluorocarbon 11 (auxiliary blowing agent) | 4.00 |
| Triethylenediamine (33 percent in dipropylene glycol) [2] | 0.25 |
| Toluene diisocyanate (80/20:2,4/2,6 isomer ratio) | 57.80 |

[1] L-540® Union Carbide Corporation.
[2] Dabco 33 LV® Houdry Chemical Corporation.

TABLE 1b

| Ingredients: | Parts |
|---|---|
| 3000 MW polyoxypropylene triol | 100.00 |
| Stannous octoate | 0.30 |
| Silicone surfactant [1] | 0.75 |
| Water | 2.50 |
| Triethylenediamine (33 percent in dipropylene glycol) [2] | 0.25 |
| Toluene diisocyanate (80/20:2,4/2,6 isomer ratio) | 37.50 |
| #1 barytes | 125.00 |

[1] L-540® Union Carbide Corporation.
[2] Dabco 33 LV® Houdry Chemical Corporation.

TABLE 1c

| | Sample | | |
|---|---|---|---|
| | A | B | C |
| Properties: | | | |
| Density (lb./cu. ft.) | 4.15 | 4.05 | 4.55 |
| 25 percent CLD (p.s.i.) | 1.00 | 0.40 | 0.70 |
| 65 percent CLD (p.s.i.) | 6.00 | 1.00 | 2.80 |
| 70 percent CLD (p.s.i.) | 11.90 | 1.30 | 4.00 |
| Sac factor | 6.00 | 2.50 | 4.00 |
| Tensile strength (p.s.i.) | 36.70 | 4.30 | 9.20 |
| Elongation (percent) | 170 | 90 | 90 |

This example shows the tremendous increase in Sac factor, tensile strength, and elongation occasioned by the practice of this invention and the synergistic enhancement of these properties over the same properties of other conventional, water-blown, flexible polyurethane foams of similar density. Note that the amount of water used in sample A is four times that used in sample B and about twice that used in sample C; this clearly illustrates the desirable load supporting ability of the biuret and urea linkages caused by the reactions involving water.

EXAMPLE 2

A 2 inch thick sample of foam (A) from Example 1 was wrapped co-jointly with a woven cotton sheet about a 4 inch diameter mandrel under light tension and heated to 285° F. for three hours. Upon unwrapping and cooling the foam was found to have a density of 2.60 pounds per cubic foot. The formulation in Table 1a was then changed in water and toluene diisocyanate to give a foam (D) of 2.60 pounds per cubic foot density. The properties of these foams were determined and are listed below in Table 2 for comparison.

TABLE 2

| | Sample | |
|---|---|---|
| | A | D |
| Properties: | | |
| Density (lb./cu. ft.) | 2.60 | 2.60 |
| 25 percent CLD (p.s.i.) | 0.45 | 0.36 |
| 65 percent CLD (p.s.i.) | 2.20 | 0.65 |
| 70 percent CLD (p.s.i.) | 3.12 | 0.90 |
| Sac factor | 4.89 | 2.17 |
| Tensile strength (p.s.i.) | 26.40 | 8.50 |
| Elongation (percent) | 155 | 110 |

EXAMPLE 3

A 2 inch thick sample of foam (A) from Example 1 was laminated to a adhesive coated sheet of nonwoven polyester fabric (Reemay®—E. I. du Pont de Nemours & Co., Inc.), wrapped under tension about a 4 inch diameter mandrel and heated for three hours at 270° F.; the foam had a density of 2.4 pounds per cubic foot and the adhesion between the foam and the fabric was greater than the tear strength of the foam. Another 2 inch thick sample of foam (A) was adhered to a sheet of the same fabric but not compressed and heated. The CLD properties of the respective samples are listed below in Table 3.

TABLE 3

| | Sample | |
|---|---|---|
| | Compressed | Uncompressed |
| Properties: | | |
| Density (lb./cu. ft.) | 2.40 | 1.35 |
| 25 percent CLD (p.s.i.) | 0.50 | 0.40 |
| 65 percent CLD (p.s.i.) | 3.15 | 0.80 |
| 70 percent CLD (p.s.i.) | 5.00 | 1.15 |
| Sac factor | 6.03 | 2.00 |

EXAMPLE 4

2-inch thick sample of foam (A) from Example 1 was wrapped co-jointly with a woven cotton sheet and a patterned, flexible embossing blanket therebetween about a 4 inch diameter mandrel and heated to 270° F. for three hours. After unwrapping and cooling the compressed foam displayed a reverse image of the embossing pattern and showed a density of 2.1 pounds per cubic foot. Another 2 inch thick sample of foam (A) was wrapped co-jointly with a woven cotton sheet about a 4-inch diameter mandrel and processed similarly to the embossed sample. The CLD properties of the respective samples were determined and are shown below in Table 4.

TABLE 4

| | Sample | |
|---|---|---|
| | Embossed | Not embossed |
| Properties: | | |
| Density (lb./cu. ft.) | 2.10 | 2.06 |
| 25 percent CLD (p.s.i.) | 0.30 | 0.40 |
| 65 percent CLD (p.s.i.) | 2.00 | 1.50 |
| 70 percent CLD (p.s.i.) | 2.90 | 2.20 |
| Sac factor | 6.67 | 3.75 |

This example shows the additional load bearing improvement occasioned by embossing at least one surface of the compressed layer of foam.

EXAMPLE 5

A sample (E) of a conventional nonwater-blown, flexible polyurethane foam was made according to the formula shown below in Table 5a. A 2 inch thick layer was cut from the "bun" and wrapped in a woven cotton fabric liner and heated to 270° F. For three hours. The original density was found to be 5.4 pounds per cubic foot and the compressed density was found to be 15.1 pounds per cubic foot. The formulation was then modified to produce a denser foam (F) and a sample made thereof; the density was found to be 13.9 pounds per cubic foot. The foam samples were tested for load properties, the values of which are shown below in Table 5b.

TABLE 5a

| Ingredients: | Parts |
|---|---|
| 4500 MW polyoxypropylene triol (60 percent primary hydroxyls) | 100.00 |
| Triethylenediamine (33 percent in dipropylene glycol)[1] | 1.50 |
| Trichlorofluorourethane[2] | 25.00 |
| Methylene bis o-chloroaniline | 25.00 |
| Toluene diisocyanate (80/20:2,4/2,6 isomer ratio) | 21.00 |

[1] Dabco 33 LV®, Houdry Chemical Corporation.
[2] Freon 11®, E. I. du Pont de Nemours & Co., Inc.

TABLE 5b

| | Sample | |
|---|---|---|
| | E | F |
| Properties: | | |
| Density (lb./cu. ft.) | 15.10 | 13.90 |
| 25 percent CLD (p.s.i.) | 4.15 | 4.50 |
| 65 percent CLD (p.s.i.) | 37.50 | 37.50 |
| Sac factor | 9.00 | 8.50 |

The foams in this example do not exhibit a change in the number of urea linkages with a change in density and thus do not exhibit significant improvemet in Sac factor and load bearing properties by the use of this invention.

EXAMPLE 6

A sample (G) of a water-blown, barytes-loaded flexible polyurethane foam was made according to the formula shown below in Table 6a. A 2 inch thick layer was cut from the "bun" and wrapped co-jointly with a sheet of woven nylon cloth under light tension about a mandrel and heated for three hours at 270° F. The original density was found to be 1.85 pounds per cubic foot and the compressed density (after cooling and unwrapping) was found to be 4.00 pounds per cubic foot. The formulation was then modified (water and toluene diisocyanate reduced) to produce a denser foam and a sample (H) of 4.55 pound per cubic foot foam produced. The properties of the foam samples were determined and are listed below in Table 6b.

TABLE 6a

| Ingredients: | Parts |
|---|---|
| 3000 MW polyoxypropylene triol | 100.00 |
| #1 barytes | 50.00 |
| Stannous octoate | 0.35 |
| N-methyl morpholine | 0.60 |
| N,N',N',N', tetramethyl butanediamine | 0.05 |
| Water | 4.00 |
| Silicone surfactant[1] | 1.00 |
| Toluene diisocyanate (80/20:2,4/2,6 isomer ratio) | 52.00 |

[1] L-540® Union Carbide Corporation.

TABLE 6b

| | Sample | | |
|---|---|---|---|
| | G | | |
| | Uncompressed | Compressed | H |
| Properties: | | | |
| Density (lb./cu. ft.) | 1.85 | 4.00 | 4.55 |
| 25 percent CLD (p.s.i.) | 0.50 | 1.00 | 0.70 |
| 65 percent CLD (p.s.i.) | 1.20 | 4.25 | 2.80 |
| 70 percent CLD (p.s.i.) | 1.60 | 5.75 | 3.80 |
| Sac factor | 2.40 | 4.25 | 4.00 |
| Tensile strength (p.s.i.) | 8.70 | 23.6 | 8.4 |
| Elongation (percent) | 90 | 125 | 100 |

What is claimed is:

1. A method of strengthening a water-blown flexible polyurethane foam comprising the steps of:
   (a) applying a sheet of flexible material to one side of a layer of uncompressed, substantially fully-cured water-blown flexible polyurethane foam having a thickness of at least about one inch and a density up to about 1.85 pounds per cubic foot and being free of lossy material to form a laminate;
   (b) wrapping said laminate about a mandrel;
   (c) compressing said laminate about said mandrel;
   (d) uniformly heating said laminate to a temperature between about 250° F. and about 300° F.;
   (e) maintaining said temperature until the foam's resistance to compression is substantially dissipated; and
   (f) releasing said foam from compression, to densify and reset the structure of the foam and to concentrate the biuret and urea structures of the foam to obtain thereby a foam having an improved Sac factor and load carrying capacity as determined by ASTM Test 1564–65T and as compared to an uncompressed foam originally made to substantially the same density.

2. The method of claim 1 wherein said sheet of flexible material is reversibly shrinkable.

3. The method of claim 2 wherein said sheet of flexible reversibly-shrinkable material is a woven sheet of nylon fibers.

4. The method of claim 1 wherein said compressed laminate is cooled prior to step (f).

5. The method of claim 1 wherein said compressed laminate is cooled after step (f).

6. The method of claim 1 wherein the compressed foam in said compressed laminate has a density up to about 4.55 pounds per cubic foot.

7. The method of claim 1 wherein said sheet of flexible material is a non-woven sheet of polyester fibers.

8. The method of claim 1 wherein an additional layer of a material having an embossed design is disposed between said flexible material and said foam.

References Cited

UNITED STATES PATENTS

| | | | |
|---|---|---|---|
| 3,709,843 | 1/1973 | Zocco et al. | 264—321 X |
| 3,050,432 | 8/1962 | Weinbrenner et al. | 264—321 X |
| 2,406,843 | 9/1946 | Luth et al. | 156—162 |
| 3,255,877 | 6/1966 | Kracht et al. | 206—65 |
| 3,244,571 | 4/1966 | Weisman | 156—196 |
| 3,060,137 | 10/1962 | Gemeinhardt et al. | 264—321 X |
| 3,170,178 | 2/1965 | Scholl | 264—321 X |
| 3,577,519 | 5/1971 | Gambardella | 264—321 X |
| 3,650,993 | 3/1972 | Zocco et al. | 161—190 X |

PHILIP DIER, Primary Examiner

U.S. Cl. X.R.

156—192, 196; 161—159, 190; 264—54, 321

PO-1050
(5/69)

UNITED STATES PATENT OFFICE
CERTIFICATE OF CORRECTION

Patent No. 3,740,283        Dated June 19, 1973

Inventor(s) Edwin Morgan Maxey

It is certified that error appears in the above-identified patent and that said Letters Patent are hereby corrected as shown below:

Column 3, line 52, which reads: " concentrate" " should read ---"concentrate"---.

Column 3, line 72, which reads: "which" should read ---while---.

Column 4, line 38-39, which reads: "Polyurethanes" should read ---"POLYURETHANES"---.

Column 5, line 30, which reads: "staturated" should read ---saturated---.

Column 10, line 27, which reads: "a" should read ---an---.

Signed and sealed this 8th day of January 1974.

(SEAL)
Attest:

EDWARD M. FLETCHER, JR.
Attesting Officer

RENE D. TEGTMEYER
Acting Commissioner of Patents